US012450075B2

(12) United States Patent
Nelson et al.

(10) Patent No.: US 12,450,075 B2
(45) Date of Patent: Oct. 21, 2025

(54) SYSTEM AND METHOD FOR RENDERING A GRAPHICAL USER INTERFACE FOR DEFINING POLICIES TO OUTPUT DIGITAL CONTENT

(71) Applicant: NewsBreak Media Networks, Inc., Knoxville, TN (US)

(72) Inventors: Brian C. Nelson, Knoxville, TN (US); Christopher Thompson, Knoxville, TN (US)

(*) Notice: Subject to any disclaimer, the term of this patent is extended or adjusted under 35 U.S.C. 154(b) by 274 days.

(21) Appl. No.: 18/382,814

(22) Filed: Oct. 23, 2023

(65) Prior Publication Data

US 2025/0130821 A1 Apr. 24, 2025

(51) Int. Cl.
*G06F 3/048* (2013.01)
*G06F 9/451* (2018.01)
*G06Q 30/0251* (2023.01)

(52) U.S. Cl.
CPC ......... *G06F 9/451* (2018.02); *G06Q 30/0255* (2013.01); *G06Q 30/0259* (2013.01)

(58) Field of Classification Search
None
See application file for complete search history.

(56) References Cited

U.S. PATENT DOCUMENTS 7,305,691 B2 12/2007 Cristofalo
8,706,552 B1 4/2014 Benjamin et al.
8,983,137 B2 3/2015 Hradetzky
9,104,669 B1 * 8/2015 Des Jardins ......... H04N 21/812
10,176,467 B2 1/2019 Prosperie, III
11,580,565 B1 2/2023 Bradley et al.
2004/0109094 A1 6/2004 Lindsay et al.
2006/0229932 A1 10/2006 Zollo et al.
2006/0271415 A1 11/2006 Simmons et al.
2007/0132660 A1 6/2007 Nuttall
2007/0239546 A1 10/2007 Blum et al.
2008/0052168 A1 2/2008 Peters et al.
2009/0097712 A1 4/2009 Harris
2009/0301189 A1 12/2009 Ross, Jr. et al.
2009/0320072 A1 * 12/2009 McClanahan ...... H04N 21/4532 725/47
2010/0042911 A1 2/2010 Wormald et al.
2010/0318916 A1 * 12/2010 Wilkins ................. G06Q 10/10 715/730
2011/0040611 A1 2/2011 Simmons et al.
2011/0282727 A1 11/2011 Phan et al.
2012/0221478 A1 8/2012 Musial et al.
2013/0151332 A1 6/2013 Yan et al.
2013/0191207 A1 7/2013 Smallwood et al.
2013/0262494 A1 * 10/2013 Petersen ................ G06Q 10/10 707/E17.014

(Continued)

FOREIGN PATENT DOCUMENTS

WO 2018075477 A1 4/2018

*Primary Examiner* — Thanh T Vu
(74) *Attorney, Agent, or Firm* — Patterson Intellectual Property Law, PC

(57) ABSTRACT

An embodiment described herein provides for a server to receive an input to define a policy for outputting digital content. The server is configured to generate a data structure based on inputs received from a graphical user interface. The data structure is used to determine whether to output the digital content at a product terminal of a plurality of product terminals.

20 Claims, 11 Drawing Sheets

(56) References Cited

U.S. PATENT DOCUMENTS

| | | | |
|---|---|---|---|
| 2013/0264385 A1 | 10/2013 | Stoudt et al. | |
| 2013/0346221 A1 | 12/2013 | Rangachari et al. | |
| 2014/0019256 A1 | 1/2014 | Argue et al. | |
| 2014/0093125 A1 | 4/2014 | Hradetzky | |
| 2014/0310108 A1* | 10/2014 | Ryu | G06Q 30/0276 705/14.72 |
| 2024/0168774 A1* | 5/2024 | Sharan | H04L 65/403 |

* cited by examiner

SYSTEM AND METHOD FOR RENDERING A GRAPHICAL USER INTERFACE FOR DEFINING POLICIES TO OUTPUT DIGITAL CONTENT

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

Entities, such as corporations, government offices, retailers, etc., often place terminals that include displays at various locations. These terminals can facilitate self-service transactions. For example, the terminals may be located at self-service gas pumps, electric chargers, self-service ATMs, airports, hotels, restaurants, etc. The terminals may also serve as product terminals that output digital content, including advertisements for products.

Entities often struggle to identify and output digital content that target specific people or groups of people at product terminals (such as self-service gas pumps, electric chargers, self-service ATMs, etc.), or the product terminals themselves, with the ultimate goal of converting single product purchasers to multi-product customers. For example, entities may want to output digital content targeted to specific people or groups of people that match a particular demographic feature or historical purchase history. Alternatively, or in addition to, entities may want to output targeted content at particular terminals based on their location or other attributes. Single product terminals present unique technical challenges. They generally have smaller storage and processor capacity, are separated from point-of-sale terminals for other products, and have varying configurations with regards to other product terminals, such as being organized around a centralized product terminal server. These particular technical limitations present problems.

A major problem for the convenience store industry is the number of customers who drive in, access a single-product terminal (for example, fuel up at a self-service gas pump or electric charger), and then drive away. While this self-service model is expedient and convenient for customers, it has posed a problem for convenience store owners who earn the majority of their profits on higher margin items sold inside the convenience store. Because the interaction time and space with such a customer is limited, convenience stores find it difficult to convey marketing messages to customers to alert them to deals, products, and services in which they might be interested. In fact, a majority of convenience store customers never set foot inside the convenience store despite convenience stores spending millions of dollars on in-store improvements to incentivize walk-ins. Without being able to market higher margin, in-store sales to a majority of customers, convenience stores struggle with profitability and split energies between commodity gasoline pricing and convenience store pricing.

Furthermore, convenience stores can differ significantly with regard to geographic variables like location, proximity to highway, accessibility, average household income for the area, average demographic segmentation, etc. Moreover, different convenience stores are subject to variable conditions such as time, weather, and temperature, which dramatically affect sales. Accordingly, there is not a one-size-fits-all approach regarding marketing and advertising. There is a benefit to displaying certain media at one convenience store while displaying other media at another convenience store, or to displaying the same or different media at all similarly situated convenience stores.

Many stores have attempted to incentivize walk-ins through at-terminal, personalized (to a person, group of people, or similarly situated terminal) advertising. However, displays at such terminals pose a number of technical obstacles that make it a challenge to display a particular advertisement at a particular time. One common method to address these issues is to use the "pull" approach, whereby data is pulled by the terminal displays (or associated hardware). But this "pull" method does not allow for the content provider to control the flow of content, as it must rely on the terminal display to pull the content. In this method, the content provider cannot decide that it wants to display a certain piece of digital content and then immediately display it on the terminal displays. It must wait for the terminal display to request any new media, which it might only do daily.

Another option is a "push" method, whereby the content provider pushes data to the product terminal display. This method generally does not work for the technical restraints of such a terminal, because the connections to many product terminals have low socket bandwidth. Additionally, terminal computing hardware often has low internet connectivity and storage, both for individual terminals and for servers associated with groups of terminals. Accordingly, stores cannot presently efficiently display particular content to a terminal of their choosing at a time of their choosing due to these technological limitations.

The claimed methods and systems address the technical limitations with respect to identifying and outputting digital content at product terminals.

BRIEF SUMMARY

Various embodiments are disclosed herein regarding a fully integrated merchandising solution that has the ability to manage and deliver content through a centralized, automated content management administrator.

An embodiment described herein includes a computer-implemented method for defining policies to output digital content. The method comprises rendering a first screen on a graphical user interface (GUI) configured to receive a first input associated with a number of times the digital content can be added to a playlist for output, rendering a second screen on the GUI configured to receive a second input associated with a priority value for inserting the digital content in the playlist, rendering a third screen on the GUI configured to receive a third input associated with a validity date for the digital content, and rendering a fourth screen on the GUI configured to receive a fourth input associated with one or more parameters for outputting the digital content. The method further comprises generating a data structure defining a policy for outputting the digital content using the first, second, third, and fourth inputs. The data structure is used to determine whether to output the digital content at a product terminal of a plurality of product terminals.

Another embodiment described herein includes a system for defining policies to output digital content. The system comprises a memory and a processor coupled to the memory. The processor is configured to render a first screen on a graphical user interface (GUI) configured to receive a first input associated with a number of times the digital content can be added to a playlist for output, render a second screen on the GUI configured to receive a second input associated with a priority value for inserting the digital content in the playlist, render a third screen on the GUI configured to receive a third input associated with a validity date for the digital content, and render a fourth screen on the GUI configured to receive a fourth input associated with one or more parameters for outputting the digital content. The processor is further configured to generate a data structure defining a policy for outputting the digital content using the first, second, third, and fourth inputs. The data structure is used to determine whether to output the digital content at a product terminal of a plurality of product terminals.

Another embodiment described herein includes a non-transitory computer-readable medium storing instructions. The instructions when executed by a processor cause the processor to execute operations comprise rendering a first screen on a graphical user interface (GUI) configured to receive a first input associated with a number of times the digital content can be added to a playlist for output, rendering a second screen on the GUI configured to receive a second input associated with a priority value for inserting the digital content in the playlist, rendering a third screen on the GUI configured to receive a third input associated with a validity date for the digital content, and rendering a fourth screen on the GUI configured to receive a fourth input associated with one or more parameters for outputting the digital content. The instructions further comprise generating a data structure defining a policy for outputting the digital content using the first, second, third, and fourth inputs. The data structure is used to determine whether to output the digital content at a product terminal of a plurality of product terminals.

DETAILED DESCRIPTION

Figure 1:
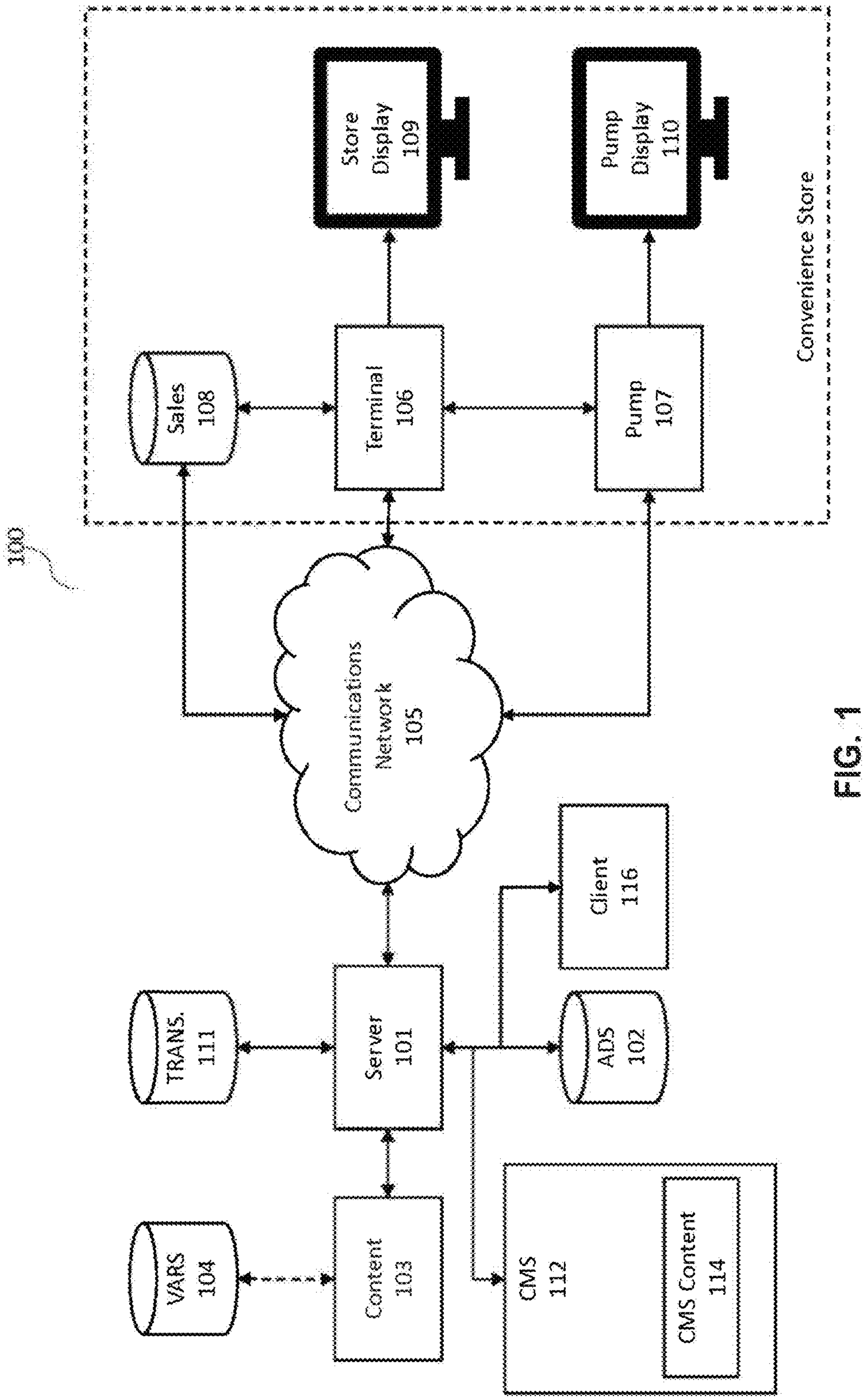
FIG. 1 is a block diagram representing an embodiment of a programmatic merchandising system, in accordance with an exemplary embodiment.

Throughout the specification and claims, the following terms take at least the meanings explicitly associated herein, unless the context dictates otherwise. The meanings identified below do not necessarily limit the terms, but merely provide illustrative examples for the terms. The meaning of “a,” “an,” and “the” may include plural references, and the meaning of “in” may include “in” and “on.” The phrase “in one embodiment,” as used herein does not necessarily refer to the same embodiment, although it may.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, “can,” “might,” “may,” “e.g.,” and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The term “communications network” as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces.

The term "display timing instructions" as used herein may refer to computer code or other data that dictates the order or timing of display. For example, a content provider could dictate, via the display timing instructions, that the relevant digital content should be displayed immediately, as soon as it is received by the product terminal. For another example, a content provider could dictate, via the display timing instructions, that the relevant digital content should be displayed after the current digital content is displayed. For yet another example, a content provider could dictate, via the display timing instructions, that the digital content should be placed at the end of the current media playlist (such as a queue of media arranged in the order it is currently to be displayed) and displayed after the contents in the current playlist are displayed. Display timing instructions may also indicate a particular time of day for displaying the digital content or other such time-related instructions.

As indicated above, conventional systems are unable to allow stores to display targeted advertising to a screen (such as a display or portion of a display at a pump) based on defined policies. An embodiment described herein provides for a server to render a first screen on a graphical user interface (GUI) configured to receive a first input associated with a number of times the digital content can be added to a playlist for output. Furthermore, the server renders a second screen on the GUI configured to receive a second input associated with a priority value for inserting the digital content in the playlist and a third screen on the GUI configured to receive a third input associated with an expiration date for the digital content. The server also renders a fourth screen on the GUI configured to receive a fourth input associated with one or more parameters for outputting the digital content. The server generates a data structure defining a policy for outputting the digital content using the first, second, third, and fourth inputs. The data structure is used to determine whether to output the digital content at a product terminal of a plurality of product terminals.

The above-described configuration allows for defining policies that govern the selection and output of digital content. The policies allow for outputting targeted advertising.

Referring first to FIG. 1, an exemplary embodiment of a programmatic merchandising system 100 as disclosed herein may include an advertising server 101 for managing and delivering advertising content. In an embodiment, server 101 may be communicatively coupled to client 116. Server 101 may render a GUI on client's 116 for uploading and managing digital content. The digital content may be multimedia advertising content 103. Managing multimedia advertising content 103 may involve creating policies for outputting multimedia advertising content 103, viewing general information about multimedia advertising content 103, adding tags, and matching channels. The GUI may receive input from client 116 to create, modify, and/or delete policies for outputting multimedia advertising content 103. Server 101 may receive the policies based on client 116's inputs and may store the policies in advertising database 102.

Server 101 may be communicatively coupled to Content Management System (CMS) 112. CMS 112 may be a headless CMS that is configured to store CMS content 114. CMS content 114 may include digital content (e.g., audio, text, and/or video data). Specifically, CMS content 114 may include advertising content that is made up of videos, graphics, and/or text. Furthermore, CMS content 114 may include data analytics information about users/customers of pump 107. For example, CMS content 114 may include names, address, age, occupation, gender, purchase history, etc. of the customers/users of pump 107. CMS content 114 may also include information about terminal 106. The information about terminal 106 may include purchase history of products available at terminal 106's location, demographics of the customers that frequent terminal 106, the current products available for purchase at terminal 106's location, etc.

Each CMS content 114 may include metadata. The metadata may include information about the particular CMS content 114. The metadata may include type of content, file type, length, targeted demographic, type of product being advertised, age restrictions, etc.

CMS 112 may be communicatively isolated from terminal 106, sales database 108, and pump 107. That is, CMS 112 may be unable to transmit and cause output of CMS content 114 at pump display 110. Pump display 110 may include one or more physical screens. CMS content 114 may be agnostic as to which device it is used to be output. As such, CMS content 114 may need to be formatted to be output by pump display 110.

In some embodiments, server 101 may identify CMS content 114 to retrieve from CMS 112 based on what is to be output on pump display 110. Server 101 may identify CMS content 114 based on the metadata of the particular CMS content 114. For example, server 101 may identify CMS content 114 that is advertising content targeted towards an age group of 18-35 based on the metadata of CMS content 114.

Server 101 may pull or retrieve the identified CMS content 114 from CMS 112. The identified CMS content 114 retrieved by server 101 may not be formatted such that it can be output on pump display 110. Server 101 may format the retrieved CMS content 114 in accordance with characteristics of pump display 110. For example, server 101 may format the retrieved CMS content 114 based on the type of device of pump display 110, version of software executed by pump display 110, type of data to be transmitted over communications network 105, file type accepted by pump display 110, etc. Furthermore, server 101 may synchronize the audio and video data in the advertising content such that it can be output by pump display 110. As a non-limiting example, server 101 may retrieve CMS content 114 from CMS 112. CMS content 114 may be a .mp4 file. Pump display 110 may only be configured to output .mpeg files. As such, server 101 may format the retrieved CMS content 114 from the .mp4 format to a .mpeg format.

In one embodiment, formatting CMS content 114 may involve server 101 generating content to be output at pump display 110. Particularly, server 101 may pull or retrieve information about users/customers of pump 107 and/or about pump 107. Server 101 may use the information to generate the content. For example, server 101 may understand that a customer named "Matt" is dispensing fuel at pump 107 based on Matt's credit card transaction at pump 107. Server 101 may retrieve information about Matt from CMS content 114. The information may include Matt's demographics, age, gender, address, purchase history, etc. Server 101 may also retrieve information about pump 107 from CMS content 114. The information may include purchase history of products available at terminal 106's location, demographics of the customers that frequent terminal 106, the current products available for purchase at terminal 106's location, etc. Based on the retrieved information, server 101 may determine that Matt's purchase history indicates Matt's affinity for Coca-Cola products and that Coca-Cola products are available for purchase at the convenience store associated with pump 107. In this regard, server 101 may generate a graphic that states "Hello Matt! Thank you for your purchase! Make sure to grab a Coke® from our store!" based on the retrieved information. Server 101 may transmit the generated graphic to terminal 106 with instructions to output the graphic on pump display 110 after Matt has completed dispensing fuel at pump 107. The generated graphic may be formatted CMS content 114.

Server 101 may cause output of the formatted CMS content 114 by transmitting the formatted CMS content 114 to terminal 106 in accordance with the policies of CMS content 114. Terminal 106 may cause pump display 110 to output the formatted CMS content 114 in accordance with the policies of CMS content 114. Outputting digital content on pump display 110 will be described in greater detail below.

In one embodiment, the formatted CMS content 114 may be stored on an advertising database 102 communicatively connected thereto. The advertising database may host a plurality of data including multimedia advertising content 103. The multimedia advertising content 103 may be associated by server 101 with one or more specific products or services to be advertised and sold at client convenience stores. For example, the multimedia advertising content 103 may include formatted, audiovisual advertisements for videographic display advertising in-store products such as food products, drink products, automotive products, alcohol, tobacco products, and the like.

Once the formatted CMS content 114 is output on pump display 110, terminal 106 can capture additional metadata about the formatted CMS content 114. The additional metadata may include details about the output of the formatted CMS content 114. For example, time and date of the output, identification of pump display 110 that output the formatted CMS content 114, fuel grade the user/customer purchased, the credit card type used, whether the entirety of the formatted CMS content 114 was output, etc. Furthermore, since the formatted CMS content 114 may be advertising content, server 101 may query terminal 106 to determine the effectiveness of the advertising content. For example, server 101 may query terminal 106 to determine whether the user/customer purchased the advertised product. The effectiveness of the advertising content may be included in the additional metadata. Terminal 106 may transmit the additional metadata to server 101. Server 101 may combine or add the additional metadata with/to the metadata associated with CMS content 114. The combined metadata along with the formatted CMS content 114 may be stored in advertising database 102.

Server 101 may further be connected to a key consumer variables database 104 upon which key consumer variables are stored in association with one or more client convenience stores. Each client convenience store may be associated by server 101 with a plurality of key consumer variables for tracking sales performance and conditions related to sales performance for each client convenience store location. In an embodiment, key consumer variables may be aggregated or grouped and further stored upon the key consumer variable database 104 in relation to a plurality of client convenience stores, such as by geographical region, by client, or by other type. For example, key consumer variables may exist for each client convenient store, for stores within a certain county, for stores within a certain state, for all stores of a certain client brand, for all independently owned stores, for all 24/7 stores, etc.

Server 101 is connected via a communications network 105 to at least one convenience store, wherein server 101 may be communicatively connected to an in-store POS terminal 106, an on-site gas pump terminal 107 (the product terminal), and a convenience store sales database 108, wherein sales data for POS terminal 106 and gas pump terminal 107 are stored. The sales database 108 may in various embodiments be stored offsite in relation to the client convenience store, to which the relation of the sales database 108 to the store terminals are logical and communicative, such as via the communications network 105. For example, a convenience store brand may store and aggregate sales data for multiple associated convenience store locations. Server 101 may be communicatively connected to this sales data via an API to extract sales data in relation to individual stores and various terminals therein. Multiple terminals are contemplated herein, wherein additional terminals function in accordance with their respective type (e.g., a pump terminal 107 or an in-store POS 106).

Server 101 may determine for a given convenience store a preliminary set of advertising content 103 and/or CMS content 114 to be delivered via the communications network 105 and displayed on-site. Server 101 may determine the preliminary set based on associated static key consumer variables determined from the variable database 104 including, at minimum, products sold by the client convenience store. For example, server 101 may determine that a convenience store only sells non-alcoholic beverages products and thereby excludes advertisements pertaining to alcohol products; or server 101 may determine from a preprogrammed association or from algorithms based on historical data analysis that umbrella advertisements generate more sales at stores in rainy areas and, therefore, selects related advertisements. Server 101 may further refine the preliminary set and determine a subset of ads to deliver based on dynamic key consumer variables. For example, server 101 may select advertisements for items which perform better given certain weather or time conditions: breakfast items in the morning; hot coffee on cold days; tire chains when snow is imminent; etc. Server 101 may continually redefine the set of advertisements primed to deliver based upon the changing of these dynamic key consumer variables.

Server 101 delivers the series of selected advertisements for display at the convenience store via video screens in accordance with the policies of the respective advertisements. The selected advertisements may be from advertising content 103 and/or CMS content 114. For example, server 101 may continuously stream or may deliver for caching and periodic playback one or more advertisements for display, such as upon an in-store display 109. Server 101 may also or alternatively deliver advertisements on demand, such as when a customer initiates a transaction at pump terminal 107. In one embodiment, server 101 may determine one or more advertisements to play based upon the selected set. In another embodiment, server 101 may determine an advertisement from additional client POS data. For example, server 101 may curate specific advertisements based on the time of the transaction, the type of fuel selected, the quality of fuel selected, the amount of fuel purchased in the transaction, the customer loyalty number entered (or lack thereof), the type of credit card, the credit card number, etc. This curation may be statically programmed, such as if the system has been programmed to select certain advertisements for customers who select premium gas or pay using an American Express card, or the curation may be dynamically determined from historical sales figures, such as if server 101 determines that advertisements for extra-large fountain drinks perform better with customers who purchase over 25 gallons of fuel in a transaction. Server 101 may transmit the targeted advertisement for display on a pump-based display screen 110. In certain embodiments, such as when targeted curation is not possible or feasible, server 101 may select an advertisement from the previously curated ads for display on the pump-based display screen 110.

In one embodiment, server 101 may, in real-time or in historical review, access and analyze the sales data from the sales database 108 and determine sales trends therefrom pertaining to item sales and transactional trends. Server 101 may further heuristically aggregate transactions based upon times following advertisement display on the one or more displays 109 and 110. For example, server 101 may identify a sale of two 24-oz. Coca-Cola products via an in-store terminal and associate that sale with a previous transaction from pump terminal 107 wherein a video was displayed for a customer on display 110 advertised two 24-oz. Coca-Cola products for the price of one during an at-pump transaction that occurred less than 300 seconds prior. The product sale and at-pump transaction may be associatively linked via direct evidence data, e.g., the same credit card, same customer loyalty number used, or use of a coupon code via the advertisement; or via extrinsic evidence data, such as time between transactions, differential from normal product sales patterns, etc.

Server 101 may store variable data and algorithms pertaining to the sales transactions in a transaction database 111 on an ongoing basis and determine therefrom via historical pattern analysis, trend differentiation, machine learning algorithms, and other similar automated methods whether certain advertisements are effective at creating sales conversions. In an embodiment, server 101 may analyze any direct evidence data or indirect evidence data to determine whether an advertisement was the likely or proximate cause for causing a customer to engage in purchasing behavior. For example, server 101 may identify an upswing in food product sales and determine that 80% of said sales can be attributed to food product advertisements displayed directly to a customer.

Server 101 may adjust the content selection and curation algorithms, or variables thereof, in response to determinations made as to effectiveness of advertisements over a period of time. Continuing the above example, server 101 may significantly increase the likelihood that food product advertisements will be displayed due to the high, 80% response rate, thereby ensuring that a food product advertisement is more likely to display than a less effective advertisement. Server 101 may further make this determination on a store-by-store basis, such as where certain stores have an 80% response rate, but other stores only have an 8% response rate. In further embodiments, server 101 may attribute differences in response rates to differences in key consumer variables and adjust the advertisement selection algorithms or variables thereof to maximize conversion for a plurality of stores based on the key consumer variables. For example, where four convenience stores have seen a 27% increase in in-store follow-up sales following display of an advertisement for energy drinks on rainy days, the system may increase the likelihood of energy drink advertisements for other stores in different geographic locations where rain is projected to occur, despite the absence of pertinent sales data for those particular stores.

In an embodiment, server 101 may further store customer profiles in association with client loyalty programs, credit card number, or another unique identifier. In an embodiment, server 101 may store the customer profiles in a customer profile database. Server 101 may determine advertisements that are more or less effective for a particular user in accordance with predetermined or analyzed customer metrics. Specifically, this customer profile may be maintained across multiple client convenience stores, such that advertisements deemed more likely to engage a specific customer in a product sale and convert the customer from a pump transaction to an in-store follow-up purchase will be displayed. For example, where server 101 would normally send for display on pump display 110 an advertisement for beer products, but server 101 has determined a unique customer from sales data from the sales database 108 and profiled said customer as never having historically purchased a beer product, server 101 may override the original determination for display of a beer ad and substitute an advertisement for an alternative product.

In certain embodiments, the system may further deliver advertisements to a customer mobile device, such as where a customer uses his or her mobile device for a customer loyalty program. Such an embodiment may be advantageous for uniquely identifying and tracking conversion rates. For example, an ad may display either on the user device or on a pump display 110, whereby a coupon QR code may be sent to the user's mobile device to be scanned at the store terminal 106 upon purchase of the advertised products to redeem a discount.

In another embodiment, a content provider can select display timing instructions (either selecting explicitly or selecting the default through inaction), after which server 101 may generate and display timing instructions for displaying advertising content 103 and/or CMS content 114 on store display 109 or on pump display 110. Server 101 may transmit data referencing advertising content 103 and/or CMS content 114 and the assigned display timing instructions to a server at either terminal 106 or pump 107, either of which are associated with the client retail location, over communications network 105. The data can, for example, be a Uniform resource Locator (URL) of the content 103 and/or CMS content 114. The server at either terminal 106 or pump 107 executes the data to request the referenced content 103 and/or CMS content 114. For example, the server creates a GET request for the URL specified in the data to retrieve the content 103 and/or CMS content 114. Thus, in response to execution of the data referencing advertising content 103 and/or CMS content 114 and the assigned display timing instructions, server 101 may send advertising content 103 and/or CMS content 114 to the server at terminal 106 or Pump 107 causing display of advertising content 103 and/or CMS content 114 based on the display timing instructions. In particular, server 101 may transmit instructions to the server at either terminal 106 or pump 107 which causes display of advertising content 103 and/or CMS content 114 at pump display 110 according to display timing instructions. The display timing instructions dictate the timing of displaying advertising content 103 and/or CMS content 114 at pump display 110. For example, display timing instructions may indicate the length of displaying advertising content 103 and/or CMS content 114, when to start displaying advertising content 103 and/or CMS content 114, when to stop displaying advertising content, etc. And the display timing instructions may do so in reference to the actual time, the current playlist of content to be played at the pump display 110, or the current content playing at the pump display 110. As a non-limiting example, display timing instructions may indicate that advertising content 103 and/or CMS content 114 is displayed immediately after the display of any other advertising content that is currently displayed on pump display 110. A user may assign default instructions for the display timing instructions at server 101. In this regard, all or part of the display timing instructions may be predetermined or preset default instructions. Finally, assigning display timing instructions can also comprise receiving playback timing instructions from the content provider, where the timing instructions are a particular rule or rules that dictate when the content 103 and/or CMS content 114 should be played, such as a rule stating that the content 103 and/or CMS content 114 should be played every thirty minutes, and assigning said received playback timing instructions as the display timing instruction. CMS content 114 may be formatted for output as described above.

The server at terminal 106 or pump 107 may be communicatively connected to terminals that are exterior to the client retail location, including pump terminal 107. The server at terminal 106 or pump 107 may send advertising content 103 and/or CMS content 114 to the terminals exterior to the client retail location, including pump terminal 107. To this end, the server at terminal 106 or pump 107 may also transmit data referencing advertising content 103 and/or CMS content 114 and the display timing instructions to pump terminal 107.

In some embodiments, advertising content 103 and/or CMS content 114, policies associated with advertising content 103 and/or CMS content 114, display timing instructions received by the servers at terminal 106 or pump 107 may be cached at that server in cache and/or non-persistent memory. For example, advertising content 103 and/or CMS content 114 can be cached at the servers at terminal 106 before it transmits advertising content 103 and/or CMS content 114 to pump terminal 107 in accordance with policies associated with advertising content 103 and/or CMS content 114.

In some embodiments, as discussed above, server 101 is associated with, and may render, a graphical user interface (GUI) through which the content provider may provide or select certain information. For example, the content provider can select the display timing instructions, the content 103 and/or CMS content 114, and/or the method of transmission.

In some embodiments, pump display 110 may also render a graphical user interface (GUI). Pump display 110 may render information about advertising content 103. For example, the information may include but is not limited to a thumbnail, link, image, description, etc. The GUI may receive a selection of advertising content 103 and/or CMS content 114 for display at pump display 110. The selection may be an input with respect to the information rendered on the GUI using one or more input devices and/or human digits.

The data may also include a reference to pump display 110 and/or pump terminal 107. The reference indicates that advertising content 103 and/or CMS content 114 is to be displayed at pump display 110. In response to execution of the data referencing advertising content 103 and/or CMS content 114 and display timing instructions, server 101 causes advertising content 103 to be displayed at pump display 110 according the display timing instructions.

In certain embodiments, as noted above, server 101 may receive a selection of advertising content 103 and/or CMS content 114 for display at on pump display 110. Pump display 110 may be located at terminal 106. In varying embodiments, Terminal 106 may be a server or set of servers that are connected to multiple pumps 107 and pump displays 110, and not a POS terminal. In those cases, server 101 can communicate with Terminal 106, which in turn communicates to the pumps 107 and pump displays 110. Terminal 106 may also be located outside a client retail location. Alternatively, in other embodiments, each pump 107 can itself have a server or set of servers, which communicate to the pump display 110. Finally, content 103 and/or CMS content 114 may be associated with one or more products or services sold at POS terminal 106 inside the client retail location.

FIGS. 2-8B illustrate an example graphical user interface for viewing and managing digital content. FIGS. 2-8B will be described with respect to FIG. 1, however, are not limited to that embodiment.

Figure 2:
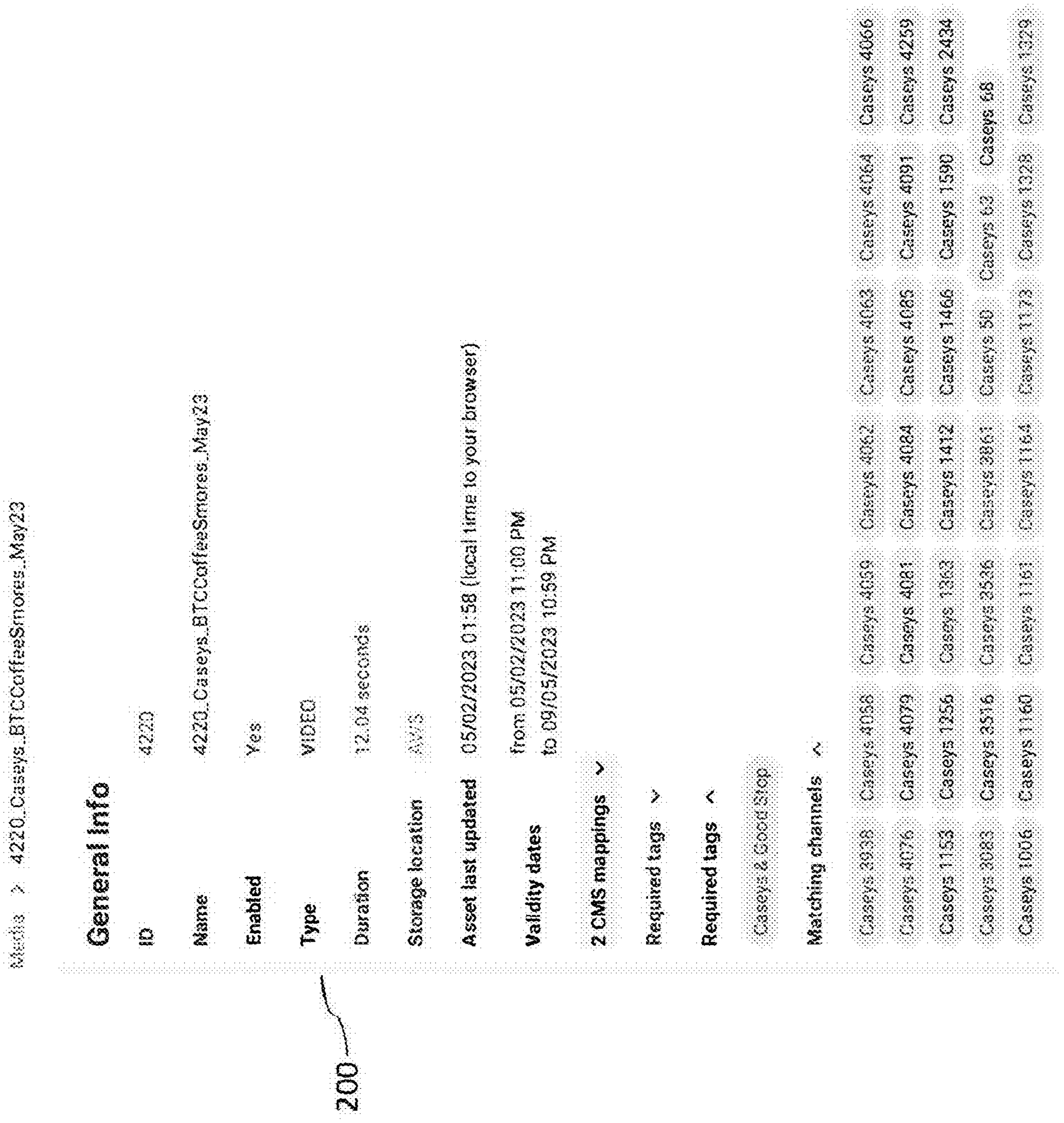
FIGS. 2-8B illustrate a graphical user interface for managing and updating policies associated with digital content.

FIG. 2 illustrates a graphical user interface rendering information about digital content in accordance with an exemplary embodiment. The digital content may be multimedia advertising content 103 or formatted CMS content 114. Server 101 may render the graphical user interface including screen 200 on client 116 based on input received from client 116. The input may be associated with viewing the general information about digital content. Screen 200 may include the general information about the digital content. The general information may include digital content's name, identifier, type (e.g., audio or video), duration, storage location, last update date, validity date, CMS format requirement mappings, tags that identify required terminal or channel attributes, a list of existing matching channels that are eligible to receive the content, etc. The validity date may provide the expiration date of digital content. That is, digital content may not be output after the expiration date.

Figure 3:
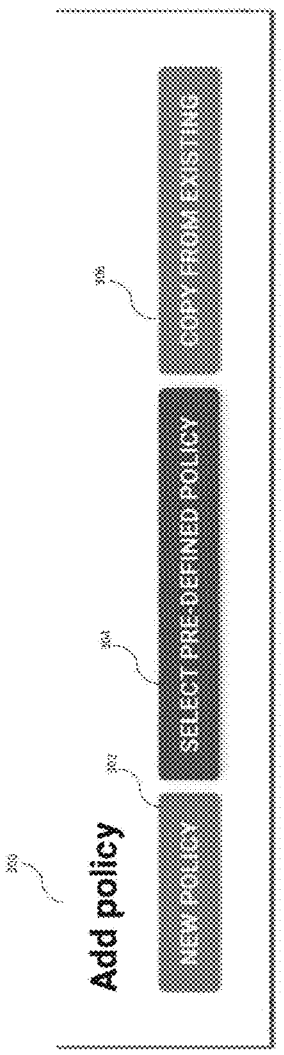

FIG. 3 illustrates a graphical user interface rendering selections for adding policies for outputting digital content in accordance with an exemplary embodiment. Server 101 may render the graphical user interface including screen 300 on client 116. Screen 300 may provide selections for adding a policy for outputting digital content. The selections may include new policy selection 302, select pre-defined policy selection 304, copy from existing selection 306. A policy may include one or more inputs which govern the selection and/or output of digital content. In response to receiving input related for select pre-defined policy selection 304 from client 116, server 101 may render a graphical user interface including a list of pre-existing policies on client 116. A user of client 116 may select a pre-existing policy from the list for digital content. In response to receiving a selection of the pre-existing policy from the list, the inputs associated with the pre-existing policy may be copied over for digital content. The inputs may be saved as a policy for digital content in advertising database 102 with digital content. The policy may govern the selection and output of digital content.

In response to receiving input related for copy from existing selection 306 from client 116, server 101 may render a graphical user interface including a list of pre-existing policies on client 116. A user of client 116 may select a pre-existing policy from the list for digital content. In response to receiving a selection of the pre-existing policy from the list, one or more of the inputs associated with the pre-existing policy may be copied over for digital content. The inputs may be saved as a policy for digital content in advertising database 102 with digital content. The policy may govern the selection and output of digital content.

In response to receiving input related for copy from existing selection 306 from client 116, server 101 may render a graphical user interface for creating a new policy for digital content.

Figure 4:
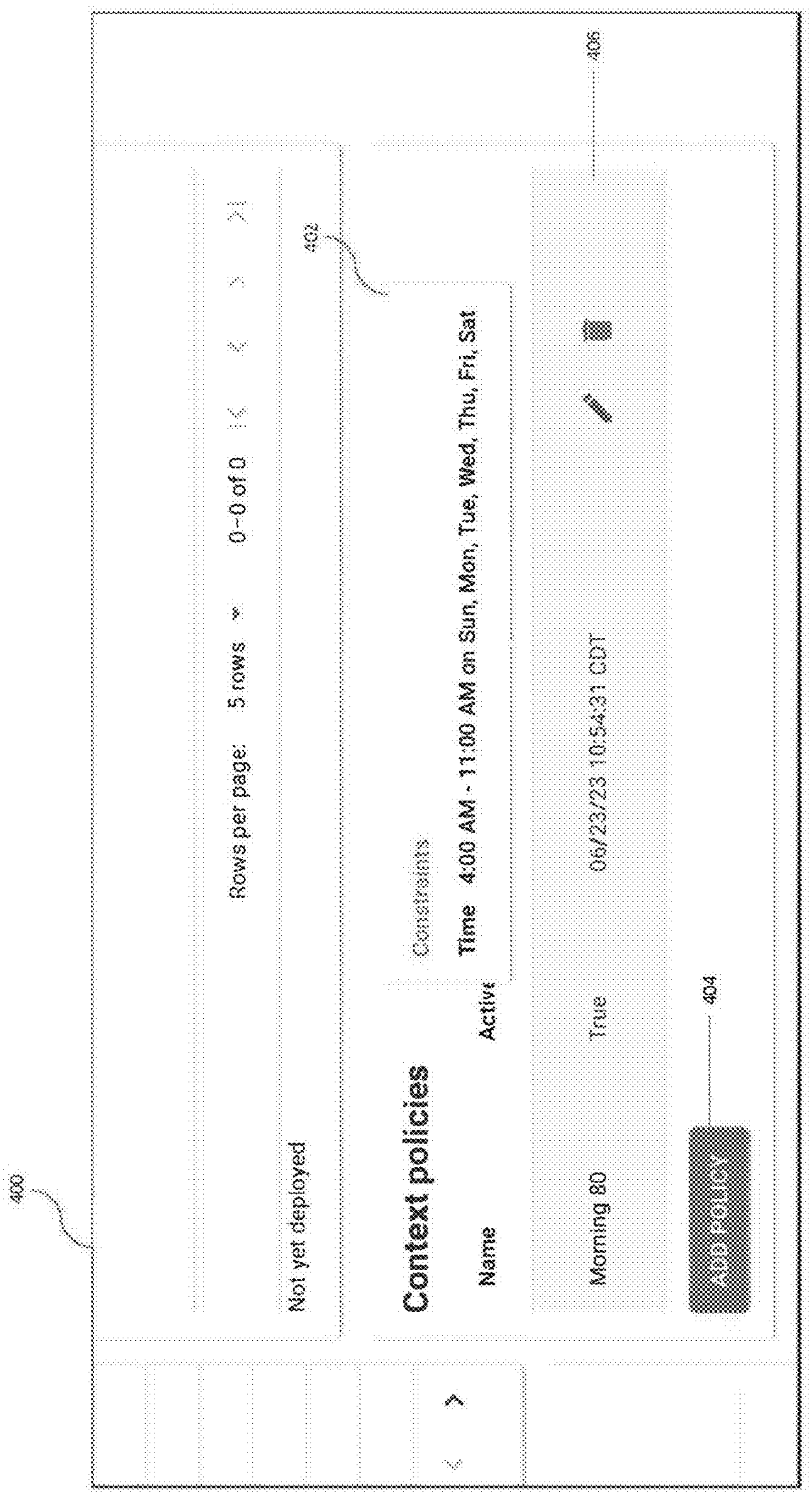

FIG. 4 is a graphical user interface rendering existing policies for outputting digital content in accordance with an exemplary embodiment. Server 101 may render the graphical user interface including screen 400 on client 116. Screen 400 may include a list of existing policies 406 for digital content. The list of existing policies 406 may include selections for deleting a policy and editing a policy. Furthermore, list of existing policies 406 may provide information related to the status of the policy, expiration date, and constraints associated with the policy. The constraints may include the days and timings at which digital content can be output. Screen 400 may also include a selection for adding a new policy 404. In response to receiving input associated with the selection for adding a new policy 404, server 101 may render screen 300 as shown in FIG. 3 on client 116.

Figure 5:
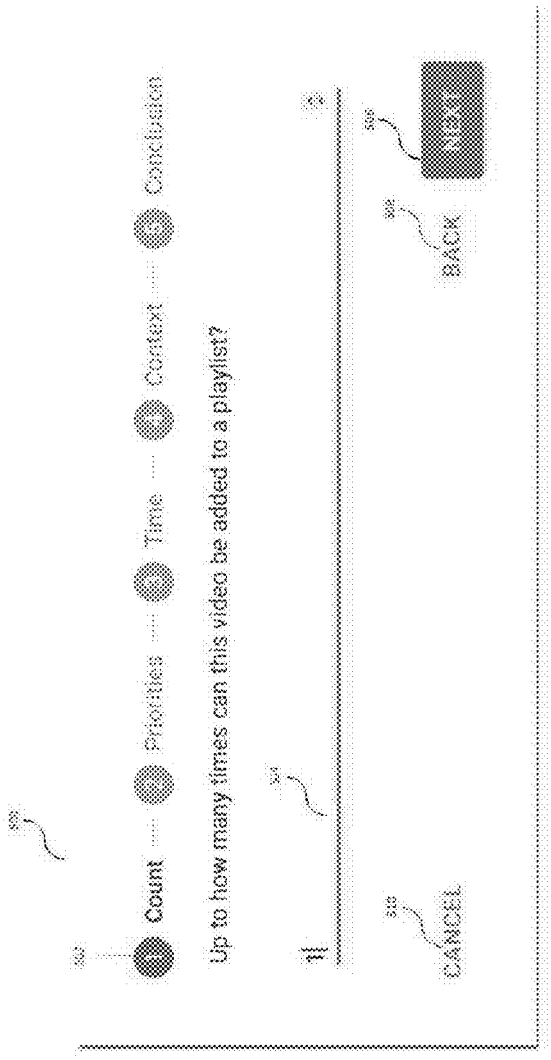

FIG. 5 is a graphical user interface for adding inputs for policies for outputting digital content in accordance with an exemplary embodiment. Server 101 may render the graphical user interface including screen 500 on client 116 in response to receiving input for adding a new policy as shown in FIG. 3. Screen 500 may be associated with count tab 502, which indicates how many times digital content may be included in a playlist of advertising content transmitted to terminal 106. As indicated above, server 101 may select and transmit a series of advertising content to be output at pump 107 and pump display 110. The series of advertising content may be a playlist of advertising content. One or more pieces of advertising content may be repeated in the playlist. Count tab 502 may receive a count input in field 504 to govern how many times digital content can be repeated on the playlist. Field 504 may accept numerical inputs.

Screen 500 may also include selections: next 506, back 508, and cancel 510. Server 101 renders the graphical user interface including the previous screen in response to receiving a selection of back 508. Server 101 cancels the creation of a new policy in response to receiving a selection of cancel 510. Server renders graphical user interface including the next screen in response to receiving a selection of next 506.

Figure 6:
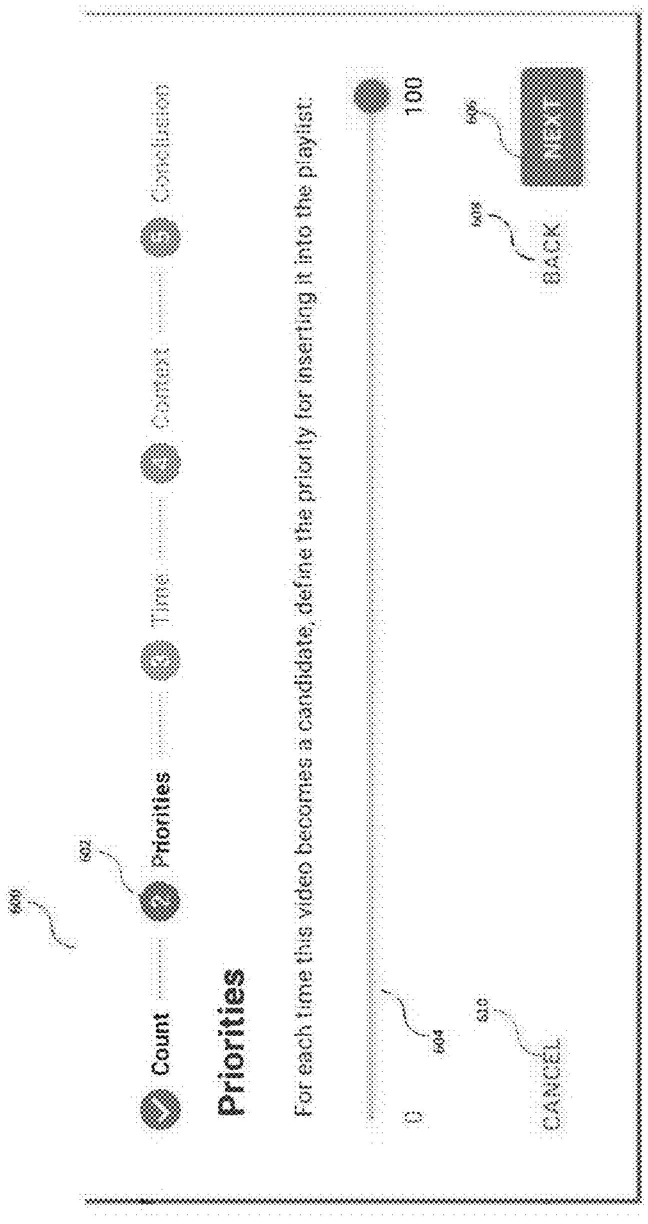

FIG. 6 is a graphical user interface for adding inputs for policies for outputting digital content in accordance with an exemplary embodiment. Server 101 may render the graphical user interface including screen 600 on client 116 in response to receiving a selection for next 506 in FIG. 5 or a back selection from a screen proceeding screen 600. Screen 600 may include priorities tab 602, which indicates a priority value that is used by server 101 to determine whether to include digital content in a playlist of advertising content to be transmitted to terminal 106. Additionally, the priority value is used by server 101 to how prominently to include digital content in the playlist (e.g., where the digital content is placed in the order of the playlist) and the timing of the content. Priorities tab 602 may receive a priority value input in field 604 to govern a priority to be used by server 101 to determine whether to include digital content a playlist of advertising content to be transmitted to terminal 106. Field 604 may be a band which ranges from value 0 to value 100. The higher the selected value the higher the priority. Alternatively, the lower the selected value the lower the priority.

Screen 600 may also include selections: next 606, back 608, and cancel 610. Server 101 renders the graphical user interface including the previous screen (i.e., screen 500) in response to receiving a selection of back 608. Server 101 cancels the creation of a new policy in response to receiving a selection of cancel 610. The count input and priority value inputs are not saved when a selection of cancel 610 is received. Server renders graphical user interface including the next screen in response to receiving a selection of next 606.

Figure 7:
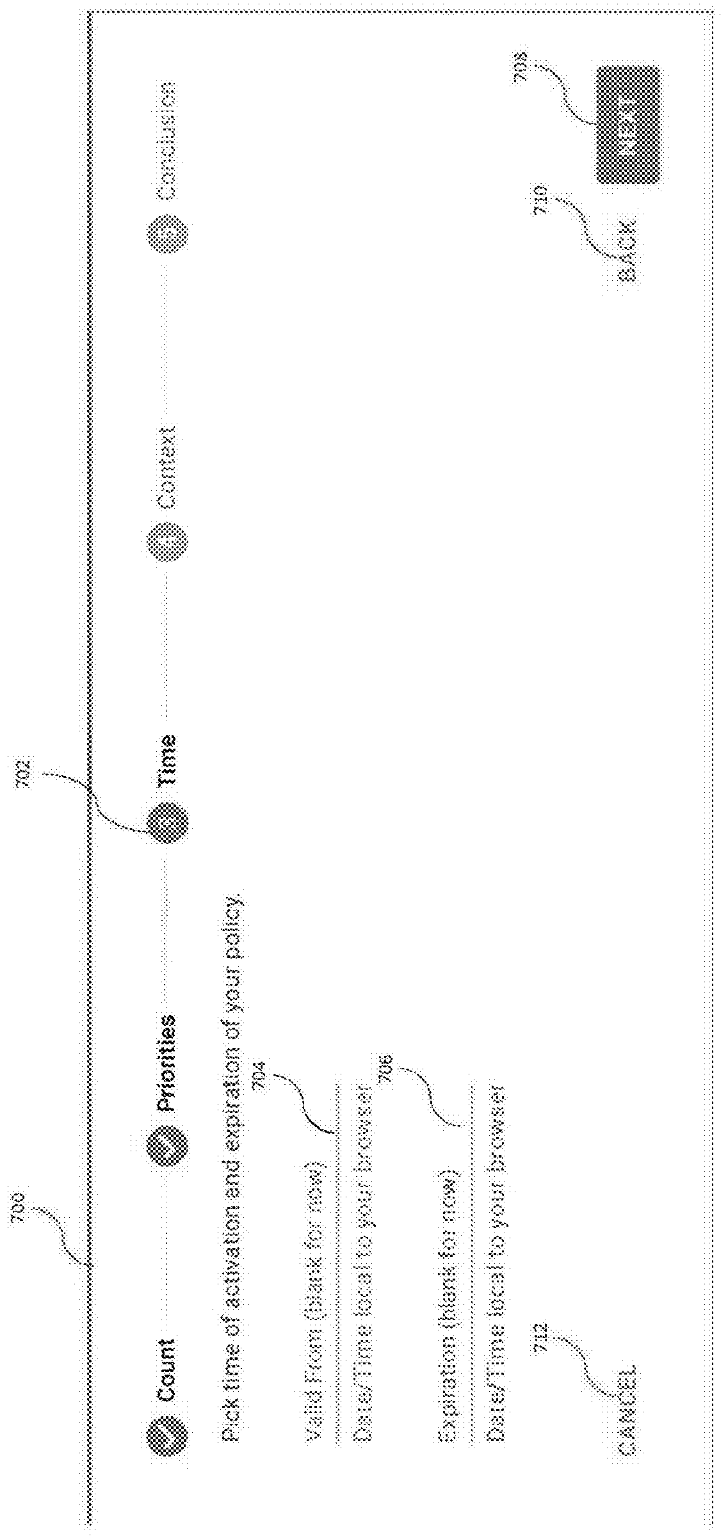

FIG. 7 is a graphical user interface for adding inputs for policies for outputting digital content in accordance with an exemplary embodiment. Server 101 may render the graphical user interface including screen 700 on client 116 in response to receiving a selection for next 606 in FIG. 5 or a back selection from a screen proceeding screen 700. Screen 700 may include time tab 702, which indicates date range of when digital content is valid (e.g., the validity date). As shown in screen 200 in FIG. 2, the validity date may provide the expiration date of digital content. That is, digital content may not be output after the expiration date. Time tab 702 may receive a date input in valid from date field 704 and date input in expiration date field 706. The date input in the valid from date field 704 may indicate a date and time when server 101 can start considering digital content for selection. That is, server 101 cannot select digital content prior to the date and time input in valid from date field 704. The date input in the expiration date field 706 may indicate a date and time when after which server 101 cannot consider digital content for selection. That is, server 101 cannot select digital content after the date and time input in expiration date field 706.

Screen 700 may also include selections: next 708, back 710, and cancel 712. Server 101 renders the graphical user interface including the previous screen (i.e., screen 600) in response to receiving a selection of back 710. Server 101 cancels the creation of a new policy in response to receiving a selection of cancel 712. The count input, priority value inputs, and date inputs are not saved when a selection of cancel 712 is received. Server renders graphical user interface including the next screen in response to receiving a selection of next 708.

Figure 8A:
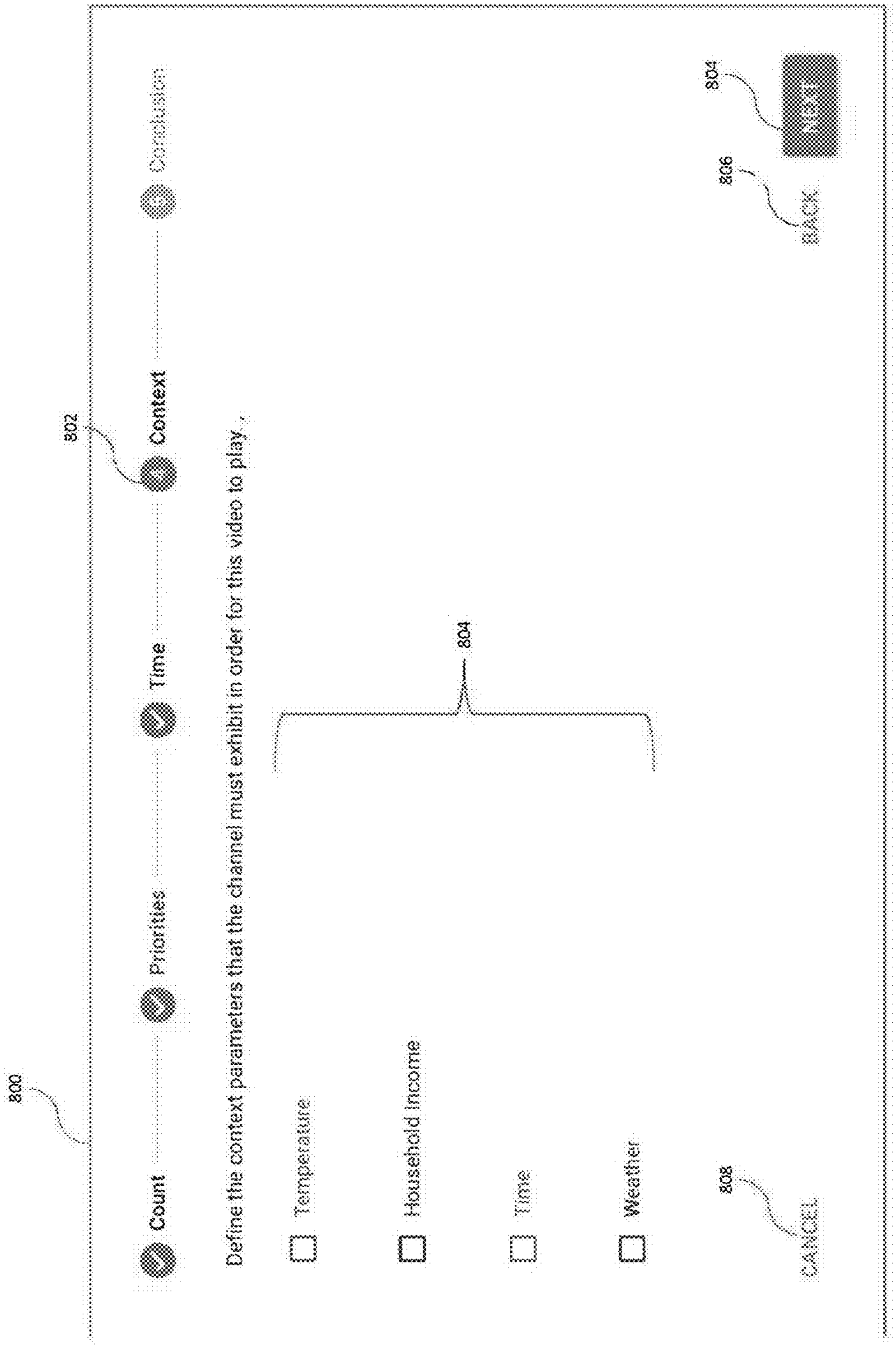
Figure 8B:
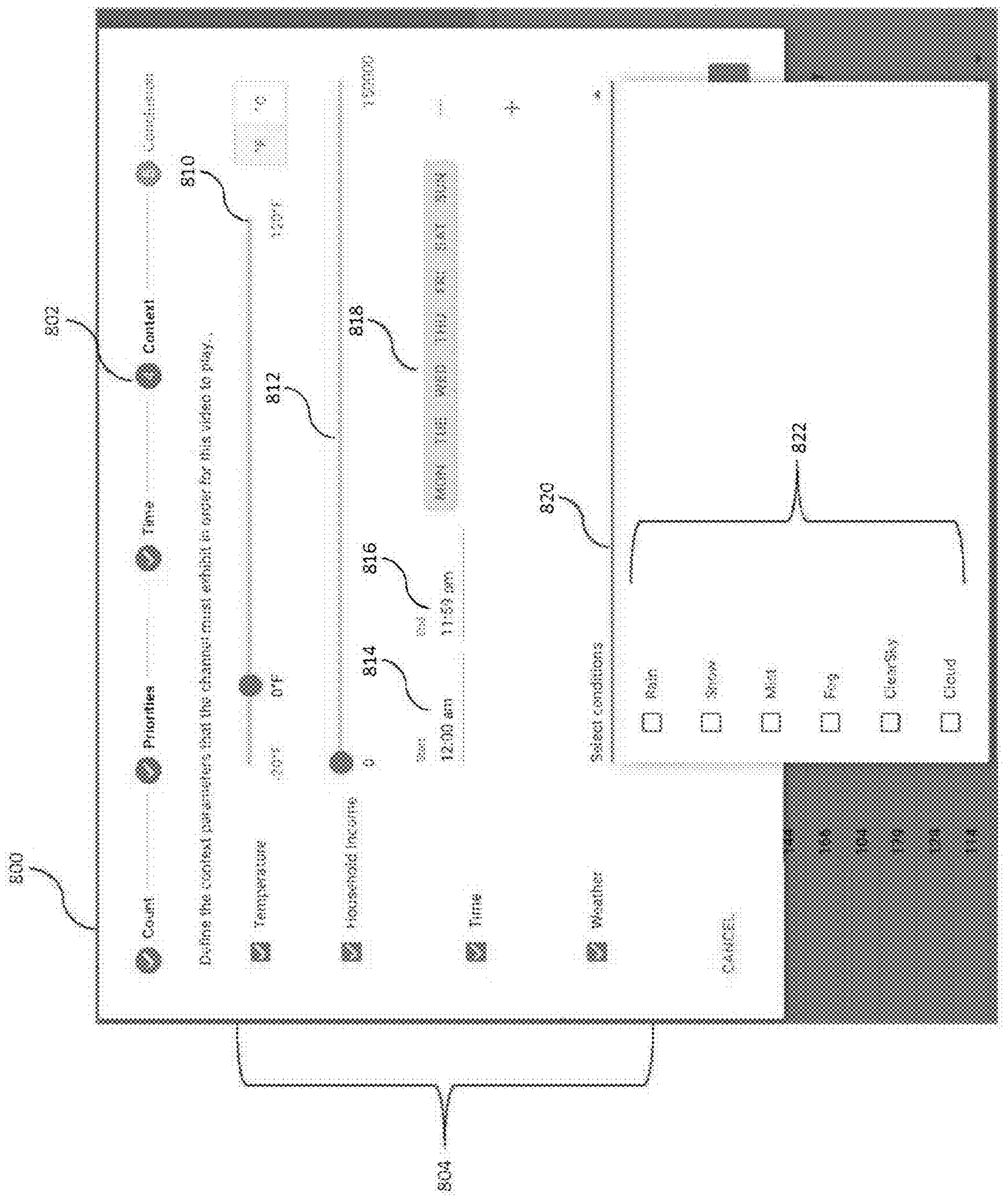

FIGS. 8A-B is a graphical user interface for adding inputs for policies for outputting digital content in accordance with an exemplary embodiment. As shown in FIG. 8A, server 101 may render the graphical user interface including screen 800 on client 116 in response to receiving a selection for next 708 in FIG. 7 or a back selection from a screen proceeding screen 800. Screen 800 may include context tab 802, which indicates context parameters 804 for outputting digital content. Context parameters 804 may include temperature, household income, time, weather, etc. Context parameters 804 define conditions which must be true for digital content to be output. Each parameter of context parameters 804 that is selected using the corresponding checkbox must be true for digital content to be output.

For example, FIG. 8B illustrates an example scenario where all of the parameters of context parameters 804 are defined. The temperature parameter may include field 810 which is configured to receive a temperature input of when digital content can be output. Field 810 may be a band including a range of temperatures in Fahrenheit or Celsius. The temperature value can be defined to output digital content in relevant temperatures. For example, if digital content is related to ice cream, the temperature value may be defined at 90 degrees Fahrenheit so that the digital content output in hot weather, and thus, is more appealing to customer. As indicated above, terminal 106 may receive digital content and its corresponding policy. As such, terminal 106 may determine the temperature at pump 107 to verify the condition defined by the temperature parameter before outputting digital content.

The household income parameter may include field 812 which is configured to receive an income value associated with the customer at pump 107. Field 812 may be a band including a range of income values (e.g., from $0-1,500,000). The income value input can govern whether digital content is relevant to a given customer. For example, if digital content is related to an expensive product, terminal 106 or server 101 may only select digital content for customers with higher than a threshold income.

The time parameter may include fields 814-818 which are configured time ranges and specific days digital content is to be output. For example, field 814 may receive a start time input. As such, digital content cannot be output before the start time input. Field 816 may receive an end time input. As such, digital content cannot be output after the end time input. Field 818 may receive a selection of days input (e.g., Sunday, Monday, Tuesday, Wednesday, Thursday, Friday, or Saturday). As such, digital content can only be output on the selected days. In this regard, if digital content is related to a product that is available at a specific day and time (e.g., a limited-time sale, happy hour, etc.), the digital content may be output in accordance with the start time input, end time input, and selection of days input.

The weather parameter may include field 820 which is configured to receive weather input. Field 820 may present a list of weather categories 822. List of weather categories 822 may include rain, snow, mist, fog, clear sky, cloud, etc. A user can select one or more of the weather categories to provide the weather input. The weather input may govern the weather in which digital content may be output. For example, digital content may be related to an umbrella product. As such, a user may select rain as the weather input so that the digital content is output when it's raining. Terminal 106 may determine if the weather forecast matches the weather input.

With reference to FIG. 8A, screen 800 may also include selections: next 804, back 806, and cancel 808. Server 101 renders the graphical user interface including the previous screen (i.e., screen 700) in response to receiving a selection of back 806. Server 101 cancels the creation of a new policy in response to receiving a selection of cancel 808. The count input, priority value inputs, date inputs, and inputs related to the context parameters are not saved when a selection of cancel 808 is received. Server 101 renders graphical user interface including the next screen in response to receiving a selection of next 804.

The next screen may be the conclusion tab. The conclusion tab may render a summary of all of the inputs received in screens 500-800. Once completed, server 101 may save the inputs as a policy for selecting and outputting digital content. That is, the count input, priority value input, time input, and inputs related to the context parameters (e.g., one or more of temperature, household income, time, and weather), together may be the policy for selecting and outputting digital content. Server 101 may select and cause output of digital content, as described above with respect to FIG. 1, based on the policy.

Server 101 may generate a data structure using the inputs received in screens 500-800. The data structure may define the policy for outputting the digital content. Server 101 may use the data structure to determine whether to include digital content in a playlist or whether to output the digital content. One or more inputs from the data structure may be used to determine whether to include the digital content in the playlist (or to output the digital content). The data structure may be stored in a database (e.g., advertising database 102) along with the digital content.

In some embodiments, multiple policies associated with the same digital content can stacked. This allows for including digital content in the playlist multiple times and at different instances based on different policies.

For example, a first policy can be generated for an advertisement for coffee (i.e., the digital content). The first policy may assign the advertisement a priority level of 100, as shown in FIG. 6. The first policy may also indicate to include the advertisement in a playlist when the temperature is below 50 degrees Fahrenheit, as shown in FIG. 8B. As such, the first policy assigns the highest priority to the assignment when the temperature is below 50 degrees.

A second policy may be assigned to the advertisement that assigns a priority level of 75, as shown in FIG. 6. The second policy may also indicate to include the advertisement in a playlist when the temperature is below 75 degrees Fahrenheit, as shown in FIG. 8B.

The first policy and second policy can be stacked. That is, both policies may operate independently so that the advertisement may be placed in a playlist twice at different instances of the playlist if the temperature is 40 degrees Fahrenheit and the playlist has enough room for the advertisement according to both the first policy (100 priority position) and in the second policy (75 priority position).

Figure 9:
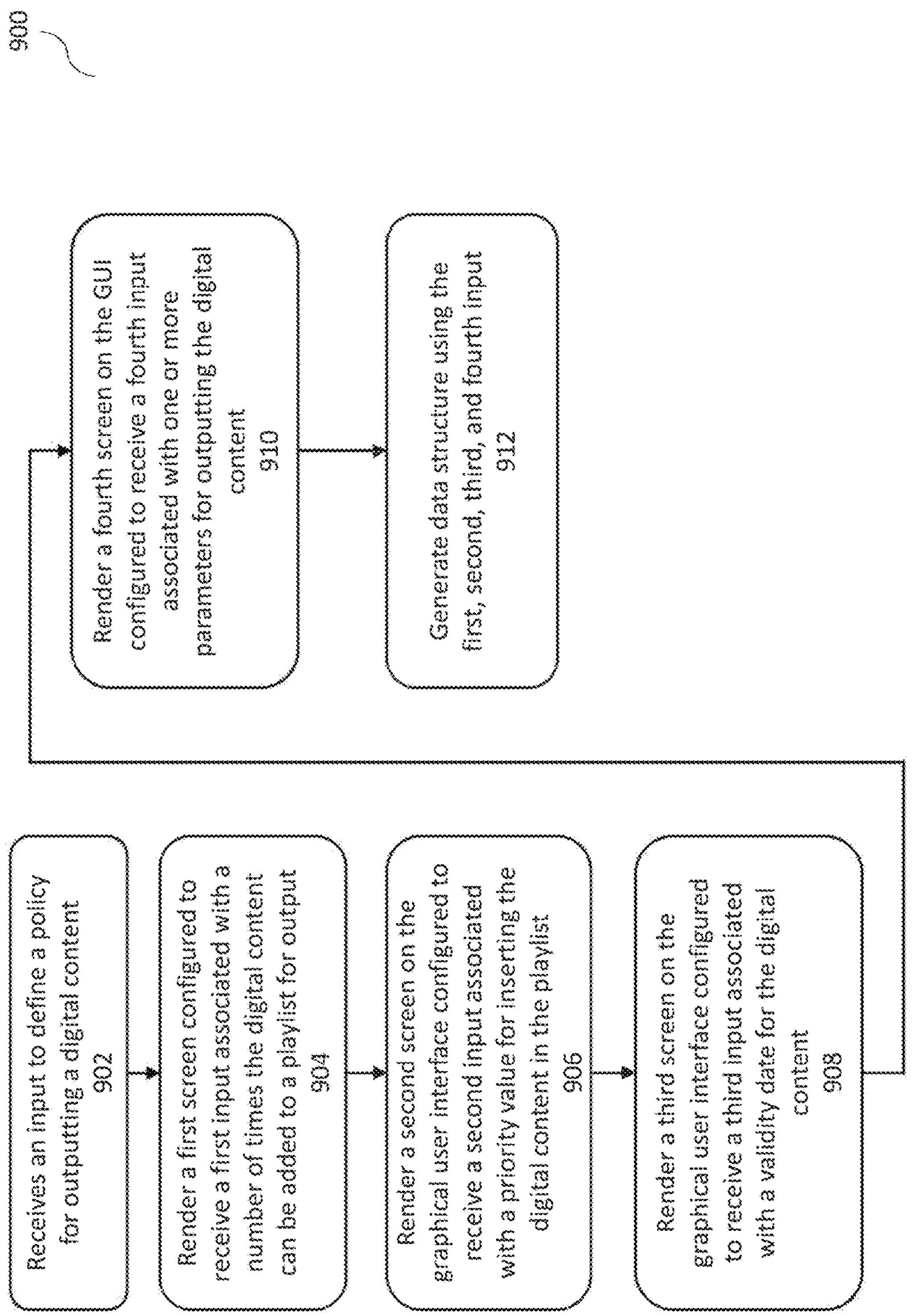
FIG. 9 a flowchart illustrating a process for rendering a graphical user interface for creating a policy associated with digital content in accordance with an exemplary embodiment.

FIG. 9 a flowchart illustrating a process for rendering a graphical user interface for creating a policy associated with digital content in accordance with an exemplary embodiment. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 9, as will be understood by a person of ordinary skill in the art. Method 900 is described with respect to FIGS. 1-8B, however, is not limited to those embodiment(s).

In 902, server 101 receives an input to define a policy for outputting digital content (e.g., multimedia advertising content 103 or CMS content 114) from client 116. Server 101 may render a graphical user interface on client 116. The graphical user interface may include screen 300 shown in FIG. 3. Server 101 may receive a selection of new policy selection 302, as shown in FIG. 3.

In 904, server 101 renders a first screen (e.g., screen 500, as shown in FIG. 5) configured to receive a first input associated with a number of times the digital content can be added to a playlist for output. The first input may be the count input. As described above, server 101 may use the count input to determine how many times a given piece of digital content may be included in the play list.

In 906, server 101 renders a second screen (e.g., screen 600, as shown in FIG. 6) on the graphical user interface configured to receive a second input associated with a priority value for inserting the digital content in the playlist. The second input may be a priority value input. Server 101 may use the priority value to determine whether or not to include a piece of digital content in a playlist.

In 908, server 101 renders a third screen (e.g., screen 700, as shown in FIG. 7) on the graphical user interface configured to receive a third input associated with a validity date for the digital content. The third input may be the date inputs for the start and expiration date of the digital content. That is, the digital content is not valid for output until the start date and after the expiration date.

In 910, server 101 renders a fourth screen (e.g., screen 800, as shown in FIGS. 8A-B) on the GUI configured to receive a fourth input associated with one or more parameters for outputting the digital content. The fourth input may be the inputs related to the context parameters. The inputs related to the context parameters define the context of when to output the digital content.

In 912, server 101 generates a data structure defining a policy for outputting the digital content using the first, second, third, and fourth inputs. The data structure is used to determine whether to output the digital content at a product terminal of a plurality of product terminals. The data structure is stored with the digital content in advertising database 102.

Figure 10:
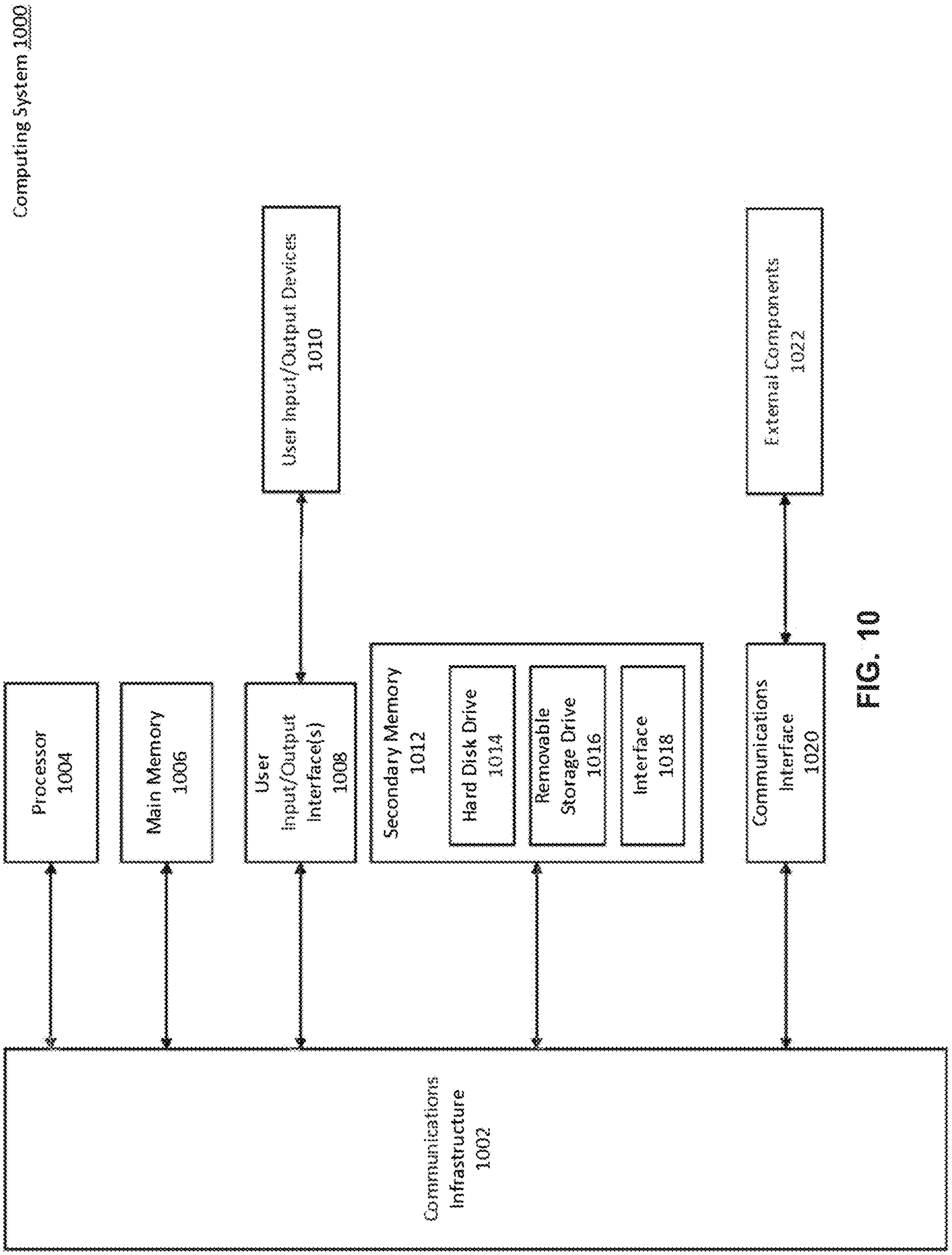
FIG. 10 is an example computer system for implementing various embodiments described herein.

Various embodiments can be implemented, for example, using one or more computer systems, such as computer system 1000 shown in FIG. 10. Computer system 1000 can be used, for example, to implement method 900 of FIG. 9. Furthermore, computer system 1000 can be at least part of one or more components of programmatic merchandising system 100, as shown in FIG. 1. Computer system 1000 can be any computer capable of performing the functions described herein.

Computer system 1000 may include one or more processors (also called central processing units, or CPUs), such as a processor 1004. Processor 1004 may be connected to a communication infrastructure or bus 1002.

Computer system 1000 may also include user input/output device(s) 1010, such as monitors, keyboards, pointing devices, etc., which may communicate with communication infrastructure 1006 through user input/output interface(s) 1008.

One or more of the processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 308, such as random access memory (RAM). Main memory 1006 may include one or more levels of cache. Main memory 1006 may have stored therein control logic (i.e., computer software) and/or data.

Computer system 1000 may also include one or more secondary storage devices or memory 1012. Secondary memory 1010 may include, for example, a hard disk drive 1014, a removable storage device or drive 1016, or interface 1018. Removeable storage device or drive 116 and interface 1018 may be coupled to storage devices such as external hard drives, USB flash drives, SD cards, Compact Discs, etc.

Computer system 1000 may further include a communication or network interface 1020. Communication interface 1020 may allow computer system 1000 to communicate and interact with any combination of external components 1024, such as external devices, external networks, external entities, etc. For example, communication interface 1002 may allow computer system 1000 to communicate with external components 1022 over a communications path, which may be wired and/or wireless (or a combination thereof), and which may include any combination of LANs, WANs, the Internet, etc. Control logic and/or data may be transmitted to and from computer system 1000 via the communication path.

Computer system 1000 may be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1006, secondary memory 1012, as well as tangible articles of manufacture embodying any combination of the foregoing. Such control logic, when executed by one or more data processing devices (such as computer system 1000), may cause such data processing devices to operate as described herein.

The previous detailed description has been provided for the purposes of illustration and description. Thus, although there have been described particular embodiments, it is not intended that such references be construed as limitations upon the scope except as set forth in the following claims.

What is claimed is:

1. A computer-implemented method for defining policies to output digital content, comprising:

rendering a first screen on a graphical user interface (GUI) configured to receive a first input associated with a number of times digital content can be added to a playlist for output;

rendering a second screen on the GUI configured to receive a second input associated with a priority value for inserting the digital content in the playlist;

rendering a third screen on the GUI configured to receive a third input associated with a validity date for the digital content;

rendering a fourth screen on the GUI configured to receive a fourth input associated with one or more parameters for outputting the digital content; and generating a data structure defining a policy for outputting the digital content using the first, second, third, and fourth inputs, wherein the data structure is used to determine whether to output the digital content at a product terminal of a plurality of product terminals.

2. The computer-implemented method of claim 1, wherein the one or more parameters include one or more of: temperature, household income, time, and weather, wherein the digital content is output at the product terminal if the one or more parameters are satisfied.

3. The computer-implemented method of claim 1, further comprising receiving a selection to copy inputs associated with a pre-existing policy for creating a new policy for outputting the digital content, wherein the pre-existing policy and new policy comprise the same inputs in response to receiving the selection.

4. The computer-implemented method of claim 1, wherein a different policy is associated with the digital content and the digital content is included in a playlist at a first instance in accordance with the policy and at a second instance in accordance with the different policy.

5. The computer-implemented method of claim 4, wherein the server transmits the digital content to the product terminal for output in accordance with the policy.

6. The computer-implemented method of claim 1, wherein the digital content is transmitted to a server as part of a playlist in accordance with the policy.

7. The computer-implemented method of claim 1, wherein the product terminal is located at an energy dispensing location.

8. A system for defining policies to output digital content, comprising:

a memory; and a processor coupled to the memory, the processor configured to:

render a first screen on a graphical user interface (GUI) configured to receive a first input associated with a number of times digital content can be added to a playlist for output;

render a second screen on the GUI configured to receive a second input associated with a priority value for inserting the digital content in the playlist;

render a third screen on the GUI configured to receive a third input associated with a validity date for the digital content;

render a fourth screen on the GUI configured to receive a fourth input associated with one or more parameters for outputting the digital content; and generate a data structure defining a policy for outputting the digital content using the first, second, third, and fourth inputs, wherein the data structure is used to determine whether to output the digital content at a product terminal of a plurality of product terminals.

9. The system of claim 8, wherein the one or more parameters include one or more of: temperature, household income, time, and weather, wherein the digital content is output at the product terminal if the one or more parameters are satisfied.

10. The system of claim 8, wherein the processor is further configured to receive a selection to copy inputs associated with a pre-existing policy for creating a new policy for outputting the digital content, wherein the pre-existing policy and new policy comprise the same inputs in response to receiving the selection.

11. The system of claim 8, wherein a different policy is associated with the digital content and the digital content is included in a playlist at a first instance in accordance with the policy and at a second instance in accordance with the different policy.

12. The system of claim 11, wherein the server transmits the digital content to the product terminal for output in accordance with the policy.

13. The system of claim 11, wherein the product terminal is located at an energy dispensing location.

14. The system of claim 8, wherein the digital content is transmitted to a server as part of a playlist in accordance with the policy.

15. A non-transitory computer-readable medium storing instructions that when executed by a processor cause the processor to execute operations comprising:

rendering a first screen on a graphical user interface (GUI) configured to receive a first input associated with a number of times digital content can be added to a playlist for output;

rendering a second screen on the GUI configured to receive a second input associated with a priority value for inserting the digital content in the playlist;

rendering a third screen on the GUI configured to receive a third input associated with a validity date for the digital content; and rendering a fourth screen on the GUI configured to receive a fourth input associated with one or more parameters for outputting the digital content, generating a data structure defining a policy for outputting the digital content using the first, second, third, and fourth inputs, wherein the data structure is used to determine whether to output the digital content at a product terminal of a plurality of product terminals.

16. The non-transitory computer readable medium of claim 15, wherein the one or more parameters include one or more of: temperature, household income, time, and weather, wherein the digital content is output at the product terminal if the one or more parameters are satisfied.

17. The non-transitory computer readable medium of claim 15, wherein the operations further comprise receiving a selection to copy inputs associated with a pre-existing policy for creating a new policy for outputting the digital content, wherein the pre-existing policy and new policy comprise the same inputs in response to receiving the selection.

18. The non-transitory computer readable medium of claim 15, wherein a different policy is associated with the digital content and the digital content is included in a playlist at a first instance in accordance with the policy and at a second instance in accordance with the different policy.

19. The non-transitory computer readable medium of claim 18, wherein the server transmits the digital content to the product terminal for output in accordance with the policy.

20. The non-transitory computer readable medium of claim 15, wherein the digital content is transmitted to a server as part of a playlist in accordance with the policy.

* * * * *